US006909494B2

(12) United States Patent
Noda et al.

(10) Patent No.: US 6,909,494 B2

(45) Date of Patent: Jun. 21, 2005

(54) IMAGE FORMING APPARATUS

(75) Inventors: Shinya Noda, Shizuoka (JP); Takaaki Kawade, Kanagawa (JP); Ken Murooka, Shizuoka (JP); Takeshi Niimura, Kanagawa (JP); Tatsuo Hamada, Shizuoka (JP); Yasuzumi Taba, Shizuoka (JP); Hideki Miyazaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/770,460

(22) Filed: Feb. 4, 2004

(65) Prior Publication Data

US 2004/0156031 A1 Aug. 12, 2004

(30) Foreign Application Priority Data

Feb. 10, 2003 (JP) ...................................... 2003-032430

(51) Int. Cl.[7] .......................... G03B 27/00; G03B 27/52

(52) U.S. Cl. ......................................... 355/405; 355/40

(58) Field of Search ............................ 344/27, 40, 405; 399/110, 124; 347/155

(56) References Cited

U.S. PATENT DOCUMENTS

| | | | | | |
|---|---|---|---|---|---|
| 5,218,411 | A | * | 6/1993 | Kosugiyama et al. | 355/285 |
| 5,519,484 | A | * | 5/1996 | Kumagai | 355/319 |
| 6,021,290 | A | | 2/2000 | Hamada et al. | 399/92 |
| 6,300,970 | B1 | | 10/2001 | Hamada et al. | 347/264 |
| 6,763,203 | B2 | * | 7/2004 | Yoshioka et al. | 399/66 |

FOREIGN PATENT DOCUMENTS

| | | |
|---|---|---|
| JP | 2001-337499 | 12/2001 |

* cited by examiner

*Primary Examiner*—Henry Hung Nguyen

(74) *Attorney, Agent, or Firm*—Fitzpatrick, Cella, Harper & Scinto

(57) ABSTRACT

A sheet supply portion is disposed in the lowermost portion of a printer so as to be substantially horizontal. A main conveying path for guiding a sheet from a transferring roller to a fixing device is disposed in a substantially vertical direction so as to be along the back of the printer. The guide surface of a sheet delivery guide constituting a conveying path leading from the fixing device to a pair of sheet delivery rollers is a flat surface.

14 Claims, 5 Drawing Sheets

IMAGE FORMING APPARATUS

BACKGROUND OF THE INVENTION

1. Field of the Invention

The invention relates to an image forming apparatus, and particularly is suitable for application to an image forming apparatus such as an electrophotographic copying machine, a printer, a word processor or a facsimile apparatus for forming an image on a recording medium.

2. Description of Related Art

The construction of a laser beam printer as an example of an image forming apparatus adopting an electrophotographic process or other recording process according to the conventional art is shown in FIGS. 4 and 5 of the accompanying drawings.

In the laser beam printer according to the conventional art, there are a case where the conveying path of a recording material leading from sheet feeding means to fixing means via transferring means is set substantially horizontally as shown in FIG. 4, and a case where it is set obliquely as shown in FIG. 5.

That is, in the laser beam printer shown in FIG. 4, a sheet supply cassette 101 on which recording materials are placed and a sheet feeding roller 102 as sheet feeding means are provided on one end side of the apparatus.

Also, a transferring roller 103 as transferring means is provided in the central portion of the apparatus, and a fixing device 104 as fixing means is disposed on the other end side of the apparatus.

Also, a process cartridge 105 as image forming means and a laser scanner 106 as a light source are disposed above a conveying surface for the recording material P. This laser scanner 106 as the light source is comprised of a polygon mirror 106*a* and a turn-back mirror 106*a*.

Further, conveying rollers 107*a* and 107*b* are disposed on the downstream side of the sheet feeding roller 102, and are designed to convey the recording material to the nip part between the transferring roller 103 and a photosensitive drum 108.

Also, the recording material P having passed through the nip part between the transferring roller 103 and the photosensitive drum 108 has an image thereon fixing in the fixing device 104, and thereafter is delivered onto a sheet delivery tray 110 through the nip part of a pair of sheet delivery rollers 109.

The feeding of the recording material P, the transfer of a visualized image (toner image) to the recording material P, and the heating and fixing of the visualized image on the recording material P are successively performed by the above-described process cartridge 105, the laser scanner 106, etc.

Such a printer, if its downsizing is contrived, is decreased in the volume of the printer itself and is reduced in heat capacity. Therefore, the temperature rise in the apparatus becomes remarkable by the heat of the fixing means which is a heat generating member.

So, some downsized printers include products adopting a construction in which the fixing means which is a heat source is disposed in the upper portion of the printer so that heat exhaust efficiency may become high. Such a product is shown in FIG. 5.

As shown in FIG. 5, in such image forming apparatus, a sheet supply cassette 201 as a sheet supply portion and a sheet feeding roller 202 as sheet feeding means are provided on the lower side thereof, a transferring roller 203 as transferring means is provided in the central portion thereof, and a fixing device 204 as fixing means is provided on the upper side thereof.

Also, louvers are provided on the upper side and sides of outer packaging 205 covering the fixing device 204, whereby the heat generated by the fixing device 204 can be efficiently delivered out of the apparatus.

A process cartridge 206 as image forming means and a laser scanner 207 as optical means having a polygon mirror 207*a* and a turn-back mirror 207*b* are disposed substantially at the same height or below the fixing device 204 as the fixing means, and the feeding of the recording material P, the transfer of the visualized image to the recording material P, and the heating and fixing of the visualized image on the recording material P are successively performed.

The recording material P after having had the image thereon fixed by the fixing device 204 passes along a curved discharge guide, whereby it assumes a posture in which the printed surface thereof faces down, and is discharged onto a sheet discharge tray 209 by a pair of sheet discharging rollers 208. In the image forming apparatus shown in FIG. 5, conveying rollers 210*a*, 210*b* and a photosensitive drum 211 are provided on the downstream side of the sheet feeding roller 202, and a motor 212 is further provided.

Also, in Japanese Patent Application Laid-Open No. 2001-337499, there is disclosed a construction in which a recording material is upwardly delivered from a fixing device, is guided by a curved delivery guide and is delivered out of an apparatus main body.

In the printer as described above, a higher speed is always desired. Particularly, to shorten the time required to output the first sheet (the first print-out time), it is effective to shorten the conveying path from the feeding to the discharge of the recording material.

In the image forming apparatuses according to the conventional art shown in FIGS. 4 and 5, the sheet delivery tray is disposed at an acute angle with respect to the conveying path. Therefore, the recording material P after having passed through the fixing means is delivered onto the sheet delivery tray along the curved discharge guide with its print surface facing down.

Therefore, when an attempt is made to shorten the sheet delivery guide, the radius of curvature thereof must be made small. However, when the sheet delivery guide is constructed with a small radius of curvature, there is the evil that the frictional sound caused by the pass of the recording material becomes great or the recording material becomes liable to be caught by the sheet delivery guide.

Therefore, the sheet delivery guide after the image on the recording material has been fixed by the fixing means must be constructed with a gentle radius, and it has been difficult to shorten the conveying path by shortening the sheet delivery guide. Also, in the technique disclosed in Japanese Patent Application Laid-Open No. 2001-337499, the sheet delivery guide downstream of the fixing apparatus is of a curved shape and therefore, in order to prevent the recording material from being caught by the sheet delivery guide, it is necessary to make the radius curvature great. This has led to the problem that the recording material having had the image thereon fixed requires a long time until it enters a pair of sheet discharge rollers, and the first print-out time becomes long. Also, as the downsizing of the printer progresses, it is necessary to make the spacing among the constituents such as the sheet feeding means, the fixing means and the process cartridge, a minimum necessary space such as the conveying path for the recording material or the mounting and dismounting locus of the process cartridge and the outer packaging of the product as short as possible.

SUMMARY OF THE INVENTION

Accordingly, it is the object of the present invention to solve the above-noted problem and to provide an image forming apparatus which can shorten the output time of the first sheet (first print-out time) and can be downsized.

To achieve the above object, the image forming apparatus of the present invention has:

a sheet placing portion disposed substantially horizontally in the lower portion of an apparatus main body to place a sheet thereon;

sheet feeding means for feeding the sheet placed on the sheet placing portion;

an image bearing member for bearing an image thereon;

transferring means for transferring the image borne,on the image bearing member to the print surface of the sheet;

fixing means for fixing the image transferred by the transferring means on the print surface of the sheet;

delivery means for delivering the sheet having had the image thereon fixed by the fixing means;

a main conveying path disposed in a substantially vertical direction on the inner part side of the apparatus main body for guiding the sheet from the transferring means to the fixing means; and a sheet delivery guide having a guide surface for contacting with the sheet to thereby guide the sheet, and constituting a conveying path leading from the fixing means to the delivery means, wherein the guide surface of the sheet delivery guide is a flat surface.

DETAILED DESCRIPTION OF THE PREFERRED EMBODIMENTS

Figure 1:
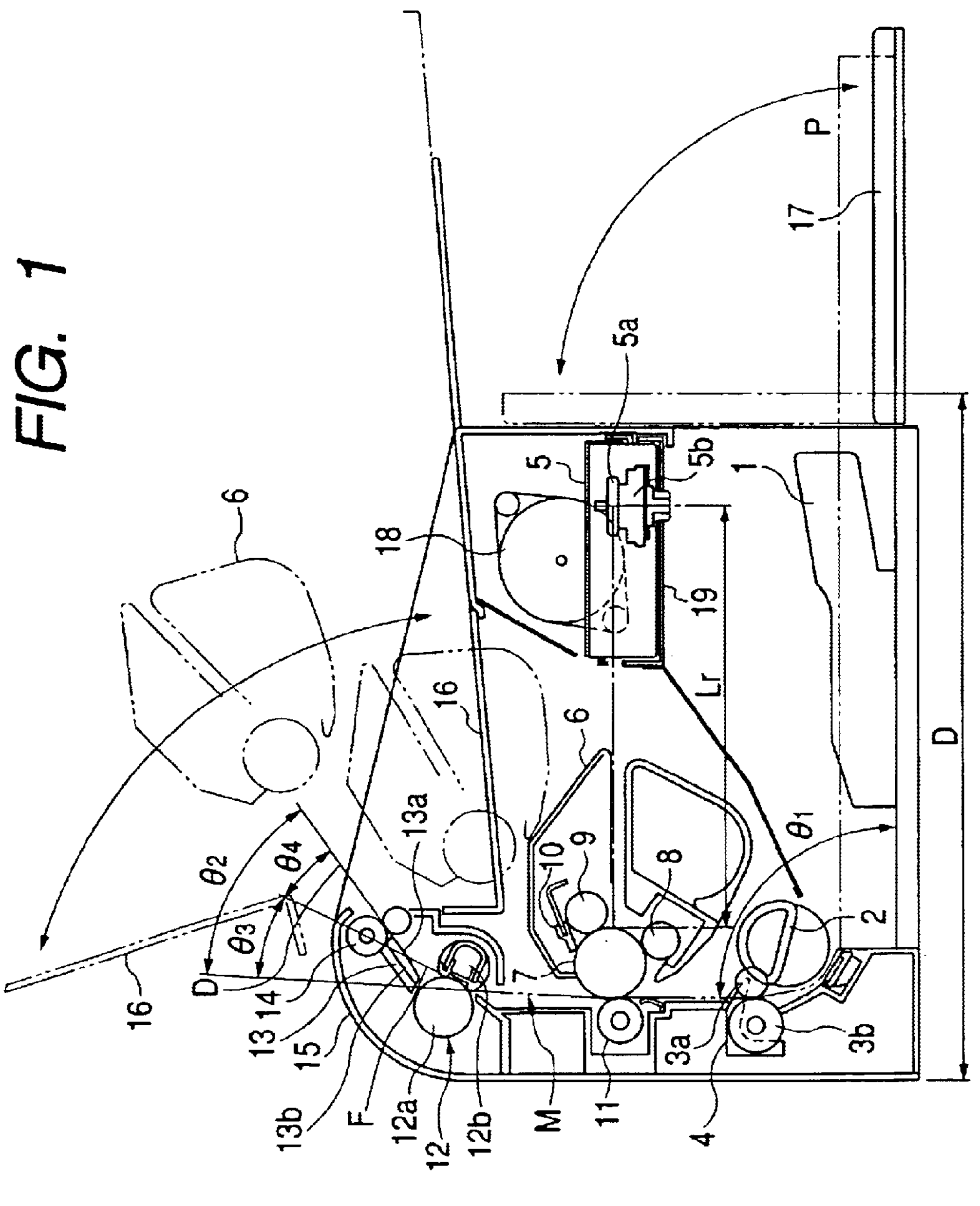
FIG. 1 is a cross-sectional view showing an image forming apparatus according to an embodiment of the present invention.

An embodiment of the present invention will hereinafter be described with reference to the drawings. Throughout the drawings of the following embodiment, like or corresponding portions are given like reference characters. FIG. 1 shows a laser beam printer which is an example of an image forming apparatus according to this embodiment.

In the laser beam printer according to this embodiment, there is adopted an electrophotographic process in which a laser beam is applied to a photosensitive member as an image bearing member and this laser beam is scanned to thereby effect recording.

That is, as shown in FIG. 1, in the laser beam printer according to this embodiment, there are provided a sheet supply portion 1 as a sheet placing portion, a sheet feeding roller 2 as sheet feeding means, conveying rollers 3*a*, 3*b*, a register sensor 4, a laser scanner 5 as optical means, and a process cartridge 6 as image forming means.

In the laser beam printer shown in FIG. 1, a plurality of recording materials P are stacked in the sheet supply portion 1. These recording materials P are separated and fed one by one by the sheet feeding roller 2 disposed on the inner side (the left side as viewed in FIG. 1) of the sheet supply portion 1, and are conveyed to a transferring portion by the conveying rollers 3*a* and 3*b*. Here, the direction in which a user faces when the user sets the recording materials P on the sheet supply portion 1 is referred to as the inner part side, and the side opposite to the inner part side is referred to as the front side. In the present embodiment, as will be described later, the user opens a sheet supply cover 17 and sets the sheets from the right side as viewed in FIG. 1 and therefore, the left side as viewed in FIG. 1 is the inner part side, and the right side is the front side.

Also, the register sensor 4 is a sensor for synchronizing the leading edge position of the recording material P with the light emission timing of the laser scanner 5 of an exposure light source, and effecting the depiction of an image from a predetermined position on the recording material P.

Further, the process cartridge 6 is constituted by process means such as a photosensitive member 7 as an image bearing member, a developing device 8 including a developer carrying member, a charging roller 9 and a cleaner 10 being made integral with one another, and is detachably mountable with respect to the printer.

Also, a transfer roller 11 as transfer means transfers a visualized image on the photosensitive member 7 onto the recording material P.

Also, a fixing device 12 as fixing means is for heating and fixing a visualized image on the recording material P. This fixing device 12 is comprised of a rotatably supported pressure roller 12*a*, and a heater unit 12*b* including a heat generating member. The pressure roller 12*a* and the heater unit 12*b* are provided so that the nip line F of the fixing device 12 may be inclined toward the front side. In the present embodiment, the fixation nip line F of the fixing device 12 is the tangent of the pressure roller 12*a* at the point of contact between the pressure roller 12*a* and the heater unit 12*b*.

A sheet delivery guide 13 is provided on the downstream side of the fixing device 12 with respect to the conveyance direction of the recording material. The sheet delivery guide 13 has a plurality of sheet delivery ribs 13*b* in the depth direction in FIG. 1. The sheet delivery ribs 13*b* have a sheet delivery guide surface 13*a* formed flat. A pair of sheet delivery rollers 14 are provided immediately downstream of the sheet delivery guide 13.

Design is made such that the nip between the pair of sheet delivery rollers 14 is located substantially on the extension plane of the sheet delivery guide surface 13*a*. Also, the extension plane of the sheet delivery guide surface 13*a* of the sheet delivery guide and the nip line D between the pair of sheet delivery rollers 14 substantially align with each other.

On the upper surface of an apparatus main body, there is provided a sheet delivery tray 16 for receiving the recording material delivered by the pair of sheet delivery rollers. The sheet delivery tray 16 serves also as the outer packaging of the apparatus main body.

The recording material P placed on the sheet supply portion 1 is fed by the sheet feeding roller 2, and is upwardly conveyed by the conveying rollers 3*a* and 3*b*. A visualized image on the photosensitive member 7 is transferred to the recording material P conveyed by the conveying rollers 3*a* and 3*b*, by the transferring roller 11. The recording material P to, which the visualized image has been transferred is conveyed while being nipped by and between the pressure roller 12*a* and the heater unit 12*b*. At that time, the visualized image is fixed on the recording material P.

The recording material P on which the visualized image has been fixed is guided by the sheet delivery guide surface 13*a* of the sheet delivery guide 13 provided from the fixing device 12 to the pair of sheet delivery rollers 14. That is, the recording material P delivered from the fixing device 12 contacts with the sheet delivery guide surface 13*a* which is a flat surface, and is bent to the print surface side thereof. Thereafter, the recording material P is delivered onto the sheet delivery tray 16 formed integrally with an outer packaging cover 15 by the pair of sheet delivery rollers 14 as delivery means comprised of only a pair of sheet delivery rollers with the print surface thereof facing downwardly. The recording material P contacts only with the sheet delivery guide surface 13*a* until it arrives at the pair of sheet delivery rollers 14 after it has been delivered from the fixing device 12. The print surface of the recording material P is the surface thereof which contacts with the photosensitive member 7. That is, the print surface of the recording material P is the right surface of the recording material being conveyed along a main conveying path M in FIG. 1.

In a case where as in the present embodiment, the nip between the pair of sheet delivery rollers 14 is located on the extension plane of the sheet delivery guide surface 13*a* which is a flat surface, as compared with a case where the recording material is guided by a curved guide, the conveyance distance until the recording material P delivered from the fixing device 12 arrives at the nip between the pair of sheet delivery rollers 14 becomes short and therefore, it becomes possible to shorten the first copy time. Also, the recording material P is directly guided to the nip between the pair of sheet delivery rollers by the sheet delivery guide 13 and therefore the occurrence of jam or the like can be prevented.

Now, in the present embodiment, as shown in FIG. 1, the main conveying path M for guiding the recording material from the sheet feeding roller 2 to the transferring roller 11 and the fixing device 12 is disposed in the shape of a straight line in a substantially vertical direction with the fixing device 12 as the uppermost portion.

By the fixing device 12 being thus disposed in the uppermost portion of the main conveying path M, heat generated from the fixing device 12 is delivered from a louver portion (not shown) formed on the outer packaging cover 15 to the outside of the image forming apparatus.

Also, heat generated from a heat source travels upwardly. Therefore, the heat generated from the fixing device 12 little affects the process cartridge 6 and the laser scanner 5 disposed below the fixing device 12 or horizontally. Therefore, it becomes possible to always obtain a good output image.

In the image forming apparatus according to the present embodiment, the main conveying path M is provided substantially parallel to the back (inner part surface) of the apparatus main body and substantially vertically in proximity to the back of the printer. By such construction, the sheet supply portion 1 provided on the bottom surface side of the apparatus main body and the sheet delivery tray 16 provided on the upper surface side of the apparatus main body and forming the outer packaging are located on the more inner part side of the apparatus main body. Thereby, the amounts of protrusion of the sheet supply portion 1 and the sheet discharge tray 16 become small and it becomes possible to reduce the installation area of the apparatus main body.

Also, in the present embodiment, an openable and closable sheet feeding cover 17 is provided on the front side of the sheet supply portion 1. When the sheet feeding cover 17 is opened to the front side, the recording material P can be placed on the sheet feeding cover 17, and during the non-use of the image forming apparatus, the sheet feeding cover 17 can be kept closed.

The main conveying path M is brought toward the inner part side of the apparatus main body and the amount of protrusion of the sheet supply portion 1 from the front is made small, whereby it becomes possible to make the sheet feeding cover 17 small and thus, the downsizing of the sheet feeding cover 17 can be achieved.

Also, a motor 18 and an optical stay 19 are provided in the image forming apparatus according to the present embodiment.

In the image forming apparatus according to the present embodiment constructed as described above, the sheet supply portion 1 is substantially horizontally constructed, and the recording material P separated by the sheet feeding roller 2 is bent into a direction of about 90° with respect to the sheet supply portion 1, and is substantially vertically upwardly conveyed along the main conveying path M.

If the angle $\theta_1$ formed between this sheet supply portion 1 and a conveying route leading from the sheet feeding roller 2 toward the transferring roller 11 is made great, the force with which the recording material is bent can be reduced. Thereby, it becomes possible to convey a thick recording material of greater stiffness, and the frictional sound of the recording material P during the conveyance thereof can be made small.

However, if this angle $\theta_1$ is made great, e.g. into an obtuse angle, this side (the right side as viewed in FIG. 1) of the sheet supply portion 1 will lower or the conveying route leading from the sheet feeding roller 2 toward the transferring roller 11 will be inclined toward the inner part side (the left side as viewed in FIG. 1). Therefore, the dimension of the printer in the vertical direction or the depth direction will become great.

So, in the present embodiment, the sheet supply portion 1 is disposed substantially horizontally, and the angle formed between the sheet supply portion 1 and the main conveying path M leading from the sheet feeding roller 2 to the transferring roller 11 is about 90° and further, the sheet supply portion 1 and the main conveying path M are disposed in proximity to the bottom surface and back, respectively, of the image forming apparatus. Thereby, the balance between the securement of sheet feeding and conveying performance and the downsizing of the printer can be achieved.

Also, the recording material P after having passed the transferring roller 11 is conveyed in a substantially vertical direction as previously described, and comes into the fixing device 12. The fixing device 12 is such that the pressure roller 12*a* and the heater unit 12*b* are brought into contact with each other with a predetermined pressure force, and when the recording material P passes between the pressure roller 12*a* and the heater unit 12*b*, the image on the surface thereof is fixed by heat and pressure.

In the present embodiment, the nip of the fixing device 12 is disposed while being inclined so that the heater unit 12*b* side may underlie the pressure roller 12*a*. When the recording material P passes the fixing device 12, it is bent to the print surface side thereof with respect to the main conveying path M. Therefore, the inclination of the sheet delivery guide 13 with respect to the main conveying path can be made great and therefore, the height from the fixing device 12 to the pair of sheet delivery rollers 14 can be made small.

Also, the main conveying path M leading from the sheet feeding means to the fixing means is made substantially vertical, whereby not only there is provided a construction in which the angle formed between the main conveying path M and the sheet delivery tray 16 is made small, but also the nip line F of the fixing device 12 is inclinedly disposed and therefore, the angle at which the recording material P is bent by the sheet delivery guide 13 can be made small.

Therefore, the sheet delivery guide 13 can be made short and be constituted by a plurality of ribs along the conveyance direction on a plane having no curved portion and thus, the downsizing of parts and the simplification of the shape become possible and a reduction in the cost of the parts can be achieved and the occurrence of the frictional sound with the recording material can be made small.

By the sheet delivery guide 13 becoming short, the recording material can be delivered onto the sheet delivery tray 16 by only a pair of rollers instead of plural pairs of sheet delivery rollers and therefore, a plurality of parts such as pairs of rollers, bearings, gears for driving the rollers, and springs for biasing the pairs of rollers can be curtailed, and a greatly lower cost can be achieved.

Also, by the conveying path being shortened, the time required from sheet feeding to sheet delivery even at the same printing speed can be shortened. In the present embodiment, it has become possible to make the conveyance distance from the center of the nip of the fixing device 12 to the nip between the pair of sheet delivery rollers 14 equal to or less than 50 mm.

Also, the recording material P, when it has passed through the fixing nip, becomes liable to cause curl (longitudinal curl) with the conveyance direction as an axis because the moisture on the print surface side heated by the heater unit 12*b* is momentarily dried and the opposite surface side is slowly dried and because of the distribution of the fibers of the recording material. In order to prevent this, in the present embodiment, the sheet delivery guide 13 contacted by the recording material P immediately after it has passed the fixing device is inclined with respect to the nip of the fixing device 12, and curl (lateral curl) with a direction orthogonal to the conveyance direction as an axis is given to the recording material P to thereby eliminate the curl of the recording material.

Table 1 below shows the relation among the angle $\theta_4$ formed between the nip line of the fixing device and the guide surface of the sheet delivery guide, the curl direction of the recording material after delivered and the curl amount. In the item of the curl amount in Table 1, the mark ○ indicates the curl amount is small, the mark Δ indicates that the curl amount is medium, and the mark indicates that the curl amount is great.

TABLE 1

| ANGLE $\theta_4$ BETWEEN FIXATION NIP LINE AND DELIVERY GUIDE | TYPE OF PAPER | CURL DIRECTION | CURL AMOUNT |
|---|---|---|---|
| 10° | PLAIN PAPER | LONGITUDINAL | Δ |
| | THICK PAPER | NO | ○ |
| 15° | PLAIN PAPER | NO | ○ |
| | THICK PAPER | LATERAL | ○ |
| 25° | PLAIN PAPER | NO | ○ |
| | THICK PAPER | NO | ○ |
| 30° | PLAIN PAPER | LATERAL | Δ |
| | THICK PAPER | LATERAL | Δ |
| 35° | PLAIN PAPER | LATERAL | X |
| | THICK PAPER | LATERAL | X |

As shown in Table 1, when the angle of the guide surface 13*a* of the sheet delivery guide with respect to the fixation nip line F of the fixing device 12 is small, longitudinal curl comes to occur to the recording material P after delivered, and as the sheet delivery guide is inclined, lateral curl gradually comes to occur. Also, when the recording material is thick and high in rigidity, the lateral curl by the bending of the sheet delivery guide becomes liable to occur. As shown in Table 1 which shows the result of an experiment, it will be seen that the correction of curl is possible in thick paper and plain paper if the angle of the sheet delivery guide surface 13*a* of the sheet delivery guide 13 with respect to the nip line F of the fixing device 12 is within a range of 15° to 30°. In the present embodiment, the sheet delivery guide is inclined by an angle of about 25° with respect to the fixation nip, whereby the compatibility of the curl correction of the recording material after delivered and a reduction in the height of the main body is realized.

Also, if the angle $\theta_3$ formed between the nip line F of the fixing device 12 and the main conveying path M is made too great, the behavior of the recording material before it enters the fixation nip will become vehement and there is the possibility of the unfixed image being disturbed. On the other hand, if the angle $\theta_3$ formed between the nip line F of the fixing device 12 and the main conveying path M is small, the amount of bending itself becomes small and therefore, the shock when the recording material rushes into the sheet delivery guide 13 becomes great. It is desirable that the angle $\theta_3$ formed between the nip line F of the fixing device 12 and the main conveying path M be within an angle range equal to or greater than 10° and equal to or less than 35°. So, in the present embodiment, the angle $\theta_3$ formed between the fixation nip and the main conveying path M is e.g. 25°.

From the relation between the inclination of the nip line F of the fixing device 12 and the inclination of the sheet delivery guide, the angle $\theta_2$ formed between the sheet delivery guide surface 13*a* of the sheet delivery guide 13 and the main conveying path M can be set to an angle equal to or greater than 25° and equal to or less than 65°. However, if the angle $\theta_2$ formed between the guide surface 13*a* of the sheet delivery guide 13 and the main conveying path M is made small, the height of the apparatus main body will become great. If the height of the apparatus main body is taken into account, it is preferable that the angle $\theta_2$ formed between the sheet delivery guide surface 13*a* of the sheet delivery guide 13 and the main conveying path M be made equal to or greater than 40°. That is, it is desirable that the angle $\theta_2$ formed between the sheet delivery guide surface 13*a* of the sheet delivery guide 13 and the main conveying path M be equal to or greater than 40° and equal to or less than 65°, and in the present embodiment, it is about 50°.

Figure 2:
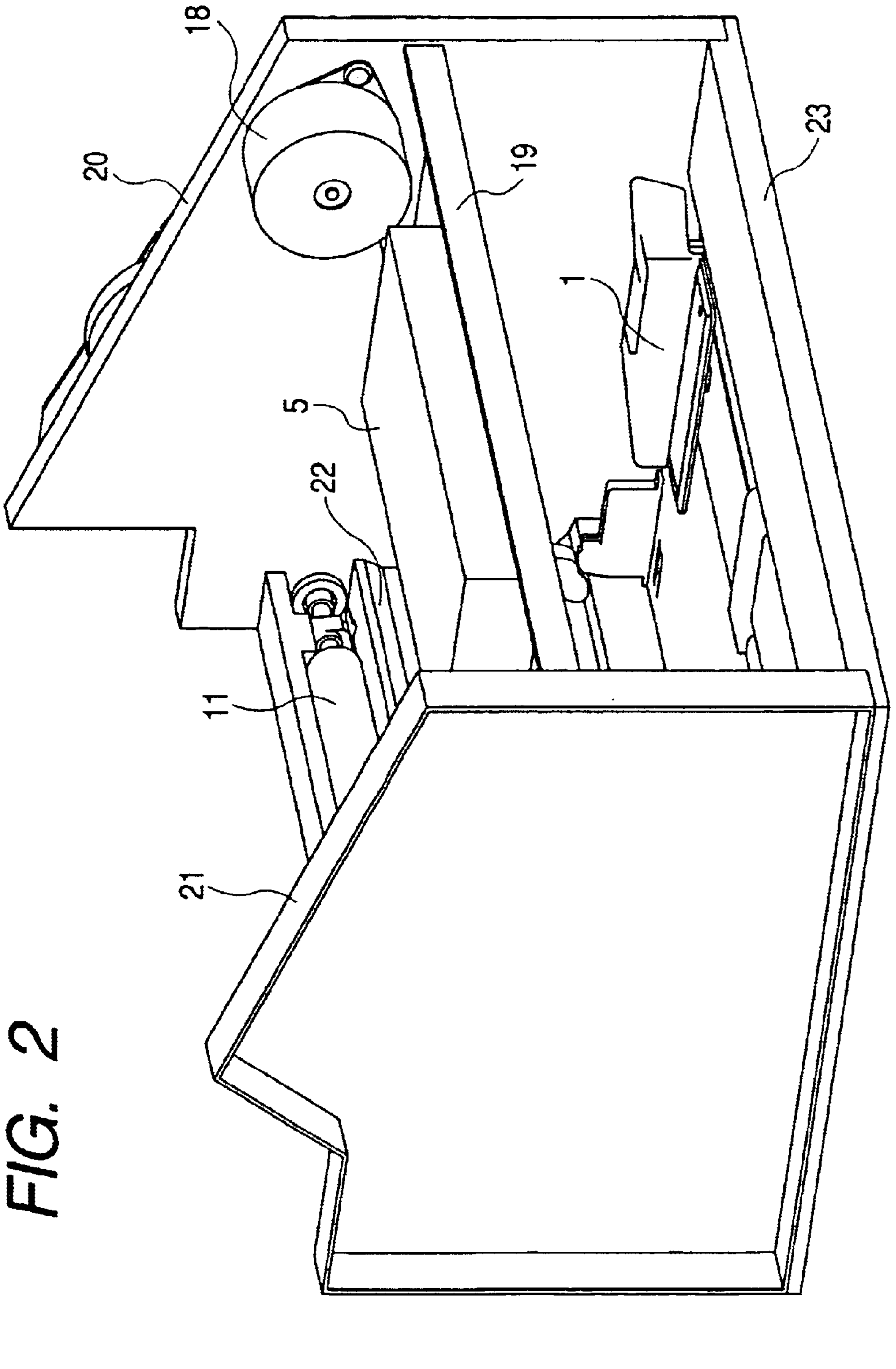
FIG. 2 is a perspective view showing the main portion of the image forming apparatus according to the embodiment of the present invention.
Figure 3:
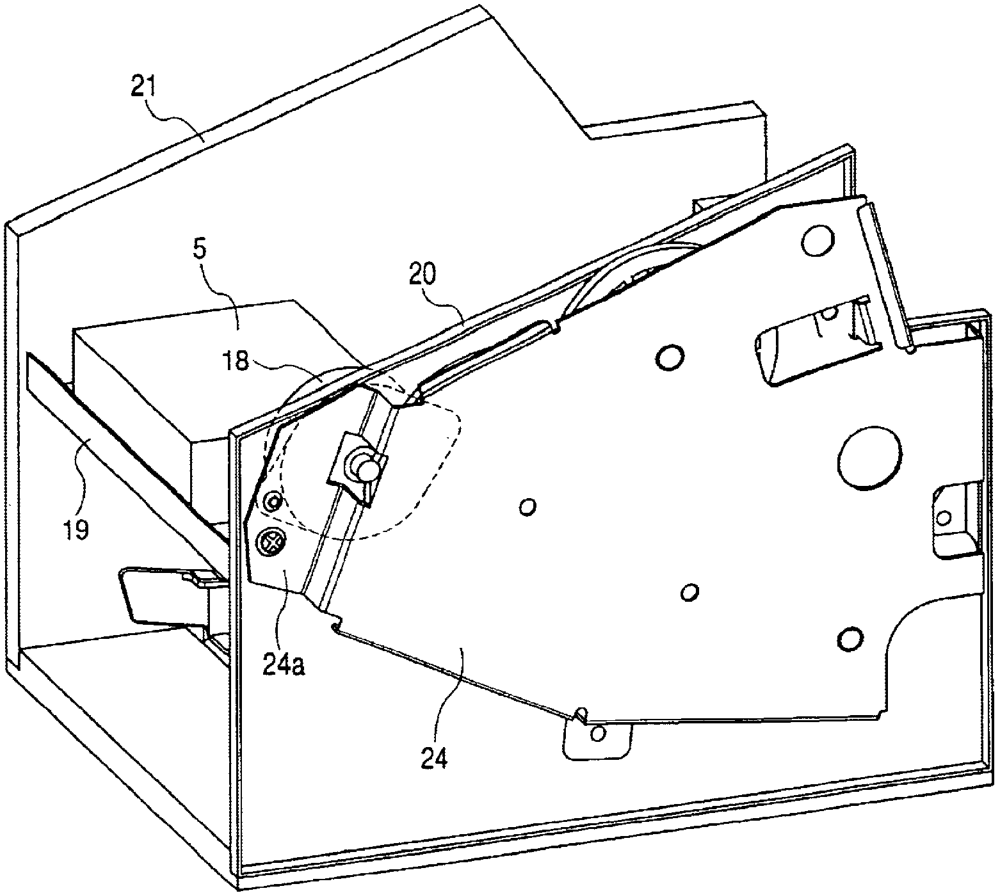
FIG. 3 is a perspective view showing the main portion of the image forming apparatus according to the embodiment of the present invention.
Figure 4:
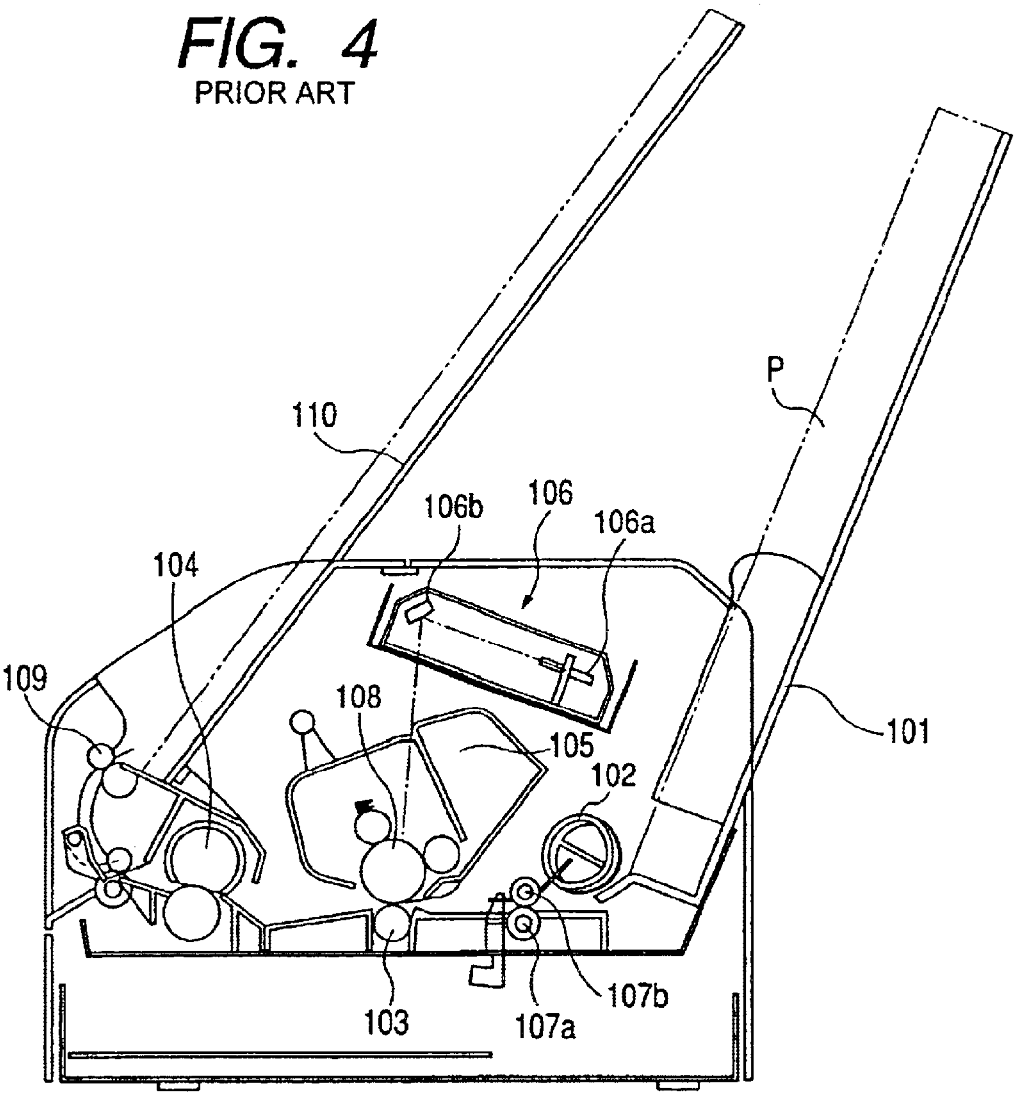
FIG. 4 PRIOR ART
FIG. 4 is a cross-sectional view showing an image forming apparatus according to the conventional art.
Figure 5:
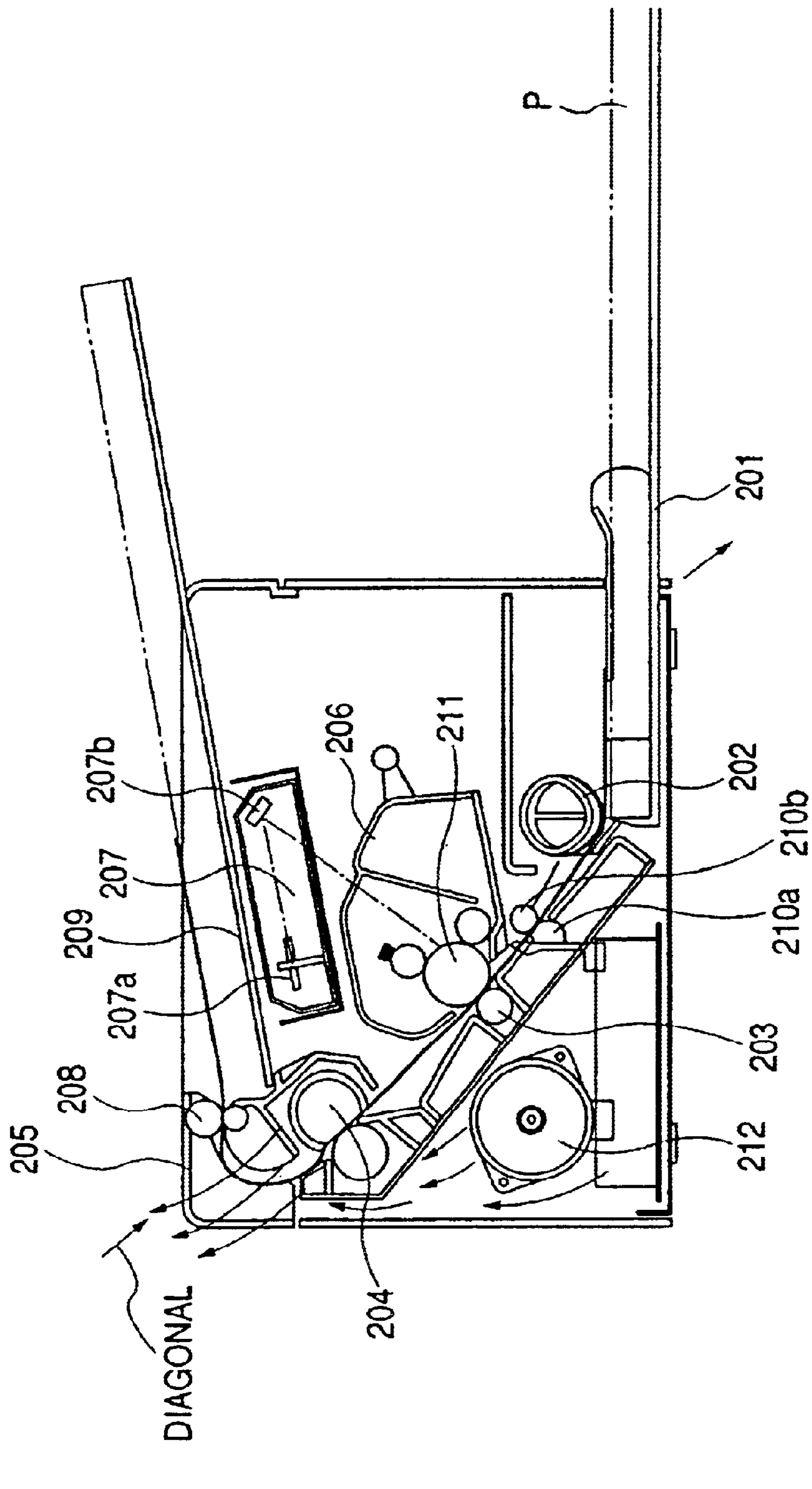
FIG. 5 PRIOR ART
FIG. 5 is a cross-sectional view showing an image forming apparatus according to the conventional art.

Description will now be made of the housing of the laser beam printer according to the present embodiment. FIGS. 2 and 3 show the housing of this laser beam printer.

As shown in FIGS. 2 and 3, the housing of the laser beam printer according to the present embodiment is comprised of an optical stay 19 comprising a metal plate for holding the laser scanner 5, side plates 20, 21 comprising metal plates, a conveying plate made of resin for holding the conveying means such as the conveying rollers 3*a*, 3*b* and the transferring means such as the transferring roller 11, and a bottom plate 23 under the sheet feeding means.

The optical stay 19, the conveying plate 22 and the bottom plate 23 are fixed by screws between the right and left side plates 20 and 21. Further, a driving cover 24 is mounted on the outer surface of the side plate 20 at a mounting portion 24*a* by a screw.

Also, as shown in FIG. 2, the laser scanner 5 according to the present embodiment is disposed at a location opposed to the so-called main conveying path M (sheet feeding means—transferring means—fixing means) leading from the sheet feeding means such as the sheet supply portion 1 and the sheet feeding roller 2 past the transferring means such as the transferring roller 11 by the conveying rollers 3*a*, 3*b* to the fixing device 12 as the fixing means, and above the sheet supply portion 1.

The laser scanner 5 is disposed in this manner, whereby a laser beam can be applied toward the photosensitive member 7 in a direction substantially perpendicular to the main conveying path M.

Further, the laser scanner 5 can be kept away from the fixing device 12 which is a heat source and therefore, there can also be obtained the advantage that it is difficult for the influence of the heat from the fixing device 12 to reach the laser scanner 5.

Also, in the image forming apparatus according to the present embodiment, the laser scanner 5 is not provided with such a turn-back mirror as in the conventional art. This laser scanner 5 is disposed substantially horizontally on this side of the apparatus. Thereby, a scanner motor 5*b* for rotating a polygon mirror 5*a* can be made horizontal.

Therefore, a load can be prevented from acting on the bearing of this scanner motor 5*b*. Accordingly, the occurrence of such inconvenience as the life of the scanner motor 5*b* being shortened by the shaving of the bearing can be suppressed, and it becomes possible to use the scanner motor 5*b* for a long period of time.

The laser beam scanned by the polygon mirror 5*a* is adjusted into a predetermined spot diameter by a lens (not shown), and thereafter arrives at the surface of the photosensitive member 7. Also, the route from the polygon mirror 5*a* to the photosensitive member 7 can be made straight without a turn-back mirror being provided and therefore, a laser optical path length Lr becomes dominant in the depth (the horizontal direction as viewed in FIG. 1) of the printer.

In the present embodiment, the diameter of the photosensitive member 7, the horizontal size of the transferring roller 11 or the like, and the distance from the center of the polygon mirror 5*a* to the front of the image forming apparatus are reduced. Therefore, the depth dimension D of the printer is made equal to or greater than 1.5 times the laser optical path length Lr and equal to or less than two times Lr. It is possible to support the trailing edge side of the recording material P placed on the sheet supply portion 1 in the feeding direction thereof by the use of the openable and closable sheet feeding cover 17 to thereby shorten the dimension of the apparatus main body in the horizontal direction (the front to inner part direction).

Also, as shown in FIGS. 2 and 3, the laser scanner 5 is fixed to substantially the center of the optical stay 19 supported by the right side plate 20 and the left side plate 21, and between the right side plate 20 and the laser scanner 5, there is a space. So, the motor 18 as a drive source is disposed inside the right side plate 20, and a pinion gear (not shown) is fixed to the outside of the right side plate 20 by a screw so as to protrude.

Also, the laser scanner 5 and the motor 18 are disposed so as to overlap each other in the direction of the rotary shaft of the photosensitive member 7 and therefore, it becomes unnecessary to newly provide a motor installation place, and the downsizing in the cross-sectional direction can be achieved.

Also, the motor 18 is disposed inside the right side plate 20 and therefore, outside thereof, there is only the thickness of a gear train meshing with the pinion gear (not shown), and the downsizing of the apparatus main body in the widthwise direction thereof can also be realized.

Further, the fixing device 12 and the motor 18 are disposed in spaced-apart relationship with each other at the upper corner of the printer, whereby the heat source can be dispersed and therefore, it becomes possible to avoid localized temperature rise.

In such a construction, the mounting or dismounting of the process cartridge 6 is effected above between the conveying route and the laser scanner 5 with the sheet delivery tray 16 opened. Thereby, the distance from an opening formed by the sheet delivery tray 16 being opened to the process cartridge can be shortened and therefore, the accessibility to the process cartridge is improved, and this becomes preferable regarding usability.

Also, an optical cover is provided between the right side plate 20 and the left side plate 21 in such a manner as to cover the laser scanner 5 and the motor 18.

Thereby, there is not a convex portion by the motor 18 in the mounting and dismounting locus of the process cartridge and therefore, in a state in which the process cartridge has been taken out during jam clearance, not only the conveying path can all be looked out over, but there is not a convex portion contacted by the user's hand when the recording material which has caused paper jam is removed, whereby jam clearing-ability can be improved.

While an embodiment of the present invention has been specifically described above, the present invention is not restricted to the above-described embodiment, but various modifications based on the technical idea of the present invention are possible.

For example, the numerical values mentioned in the above-described embodiment are merely illustrative to the last, and different numerical values may be used as required.

While the fixing device 12 comprising the rotatably supported pressure roller 12*a* and the heater unit 12*b* including a heat generating member has been shown as fixing means by way of example, a pair of rollers (a pair of rotary members) may be constituted by a heat roller having a heat generating member, and a pressure roller urged against the heat roller, and the recording material may be nipped and conveyed by the pressure roller and the heat roller.

While in the present embodiment, a laser printer has been mentioned as an example of the construction of the image forming apparatus, the laser printer is not always restrictive, but the present invention can also be applied to a copying machine, a facsimile apparatus, a monochromatic copying machine or the like.

As has been described above, the sheet supply portion is disposed substantially horizontally in the lower portion of the housing, and the main conveying path comprising the sheet feeding means, the transferring means and the fixing means is disposed in the substantially vertical direction in proximity to the inner side back of the housing, and the sheet delivery guide comprises a flat surface inclined toward the printed surface side of the recording material within an angle range of 40° to 65° with respect to the main conveying path, whereby the height of the image forming apparatus above the fixing means can be made small so that a curved portion may not be provided on the sheet delivery guide and therefore, the image forming apparatus can be made thin and downsized.

Also, the nip of the fixing means is inclined within an angle range of 10° to 30° with respect to the main conveying path, whereby the delivery of the recording material from the main conveying path to the sheet delivery guide can be effected smoothly and therefore, the frictional sound can be reduced.

Also, the length of the sheet delivery guide is shortened to 50 mm or less, whereby the time required for the recording material to pass the sheet delivery guide can be shortened, and the first print-out time can be shortened.

Also, the pair of sheet delivery rollers are comprised of only a pair and therefore, a gear, a bearing, etc. for driving the rollers become unnecessary, whereby the lower cost of the image forming apparatus can be achieved.

Also, the optical means is constructed without a turn-back mirror being provided, whereby the optical means decreased in the number of parts can be horizontally disposed at a location spaced apart from the fixing means and therefore, it becomes difficult for the heat of the fixing means to affect the optical means and also, the wear resistance of the bearing portion of the scanner motor for rotating the polygon mirror can be improved.

Also, the depth dimension of the image forming apparatus is made equal to or greater than 1.4 times and equal to or less than 2 times the distance from the center of rotation of the polygon mirror in the optical means to the surface of the photosensitive member, and the second half portion of the sheet supply portion outside this range is constituted by an openable and closable cover, whereby the depth dimension of the image forming apparatus can be shortened by the cover being closed during the non-use of the apparatus.

What is claimed is:

1. An image forming apparatus comprising:

a sheet placing portion disposed substantially horizontally in a lower portion of an apparatus main body of said image forming apparatus to place a sheet thereon;

sheet feeding means for feeding the sheet placed on said sheet placing portion;

an image bearing member bearing an image thereon;

transferring means for transferring the image borne on said image bearing member to a print surface of the sheet;

fixing means for fixing the image transferred by said transferring means onto the print surface of the sheet;

delivery means for delivering the sheet having had the image thereon fixed by said fixing means;

a main conveying path disposed in a substantially vertical direction on an inner part side of said apparatus main body for guiding the sheet from said transferring means to said fixing means; and a sheet delivery guide having a guide surface for contacting with the sheet to thereby guide the sheet, and constituting a conveying path leading from said fixing means to said delivery means, wherein said guide surface of said sheet delivery guide is a flat surface.

2. An image forming apparatus according to claim 1, wherein said guide surface of said sheet delivery guide is inclined toward a side of the print surface of the sheet at an angle equal to or greater than 15° and equal to or less than 30° with respect to a nip line of said fixing means.

3. An image forming apparatus according to claim 2, wherein the nip line of said fixing means is inclined with respect to said main conveying path in a direction to bend the sheet toward the side of the print surface.

4. An image forming apparatus according to claim 3, wherein the nip line of said fixing means is inclined toward the side of the print surface of the sheet at an angle equal to or greater than 10° and equal to or less than 35° with respect to said main conveying path.

5. An image forming apparatus according to claim 2, wherein said guide surface of said sheet delivery guide is inclined toward the side of the print surface of the sheet at an angle equal to or greater than 40° and equal to or less than 65° with respect to said main conveying path.

6. An image forming apparatus according to claim 1, wherein said delivery means has a pair of sheet delivery rollers, and a conveyance distance from a nip of said fixing means to a nip of said pair of sheet delivery rollers is 50 mm or less.

7. An image forming apparatus according to claim 1, wherein said delivery means has a pair of sheet delivery rollers, and a nip of said pair of sheet delivery rollers is located substantially on an extension plane of said guide surface of said sheet delivery guide.

8. An image forming apparatus according to claim 1, wherein said delivery means has a pair of sheet delivery rollers, and a nip line of said pair of sheet delivery rollers and said guide surface of said sheet delivery guide substantially align with each other.

9. An image forming apparatus according to claim 1, further comprising optical means for applying light to said image bearing member, wherein said optical means is disposed so as to apply the light substantially perpendicularly to said main conveying path on a front side of said apparatus main body and above said sheet placing portion.

10. An image forming apparatus according to claim 9, wherein said optical means has a polygon mirror, and an optical path from said polygon mirror to said image bearing member is in a plane.

11. An image forming apparatus according to claim 10, further comprising a housing for holding said transferring means and said fixing means, wherein a size of said housing along a depth direction thereof is equal to or greater than 1.4 times and equal to or less than 2 times a spacing from a center of rotation of said polygon mirror to a surface of said image bearing member.

12. An image forming apparatus according to claim 11, wherein said sheet placing portion has a sheet feeding cover openable in a front direction of said apparatus main body, and a trailing edge side of the sheet placed on said sheet placing portion in a sheet feeding direction by said sheet feeding means is supported by said sheet feeding cover.

13. An image forming apparatus according to claim 12, wherein the size of said housing along the depth direction thereof is a spacing from a front thereof in a state in which said sheet feeding cover is closed to an inner part side surface of said housing.

14. An image forming apparatus according to claim 2, wherein said delivery means has a pair of sheet delivery rollers, and a nip of said pair of sheet delivery rollers is located substantially on an extension plane of said guide surface of said sheet delivery guide.

* * * * *